June 14, 1949.  A. N. MILSTER  2,473,168

SELECTIVE OPERATION OF SYSTEMS BY A UNIT CYLINDER

Filed Dec. 14, 1946

INVENTOR:
ARTHUR N. MILSTER

ATTORNEY.

Patented June 14, 1949

2,473,168

UNITED STATES PATENT OFFICE 2,473,168

SELECTIVE OPERATION OF SYSTEMS BY A UNIT CYLINDER

Arthur N. Milster, St. Louis, Mo., assignor to Wagner Electric Corporation, a corporation of Delaware Application December 14, 1946, Serial No. 716,269

7 Claims. (Cl. 60—54.5)

This invention relates to actuating means for a plurality of pressure fluid devices and its objects is to provide means for selectively operating the several devices by pressure fluid produced in a single master cylinder.

In the drawing—

Figure 2:
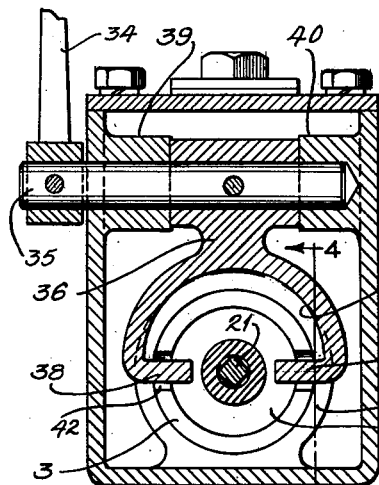
Figure 2 is a sectional view taken substantially along the line 2—2 of Figure 1.
Figure 3:
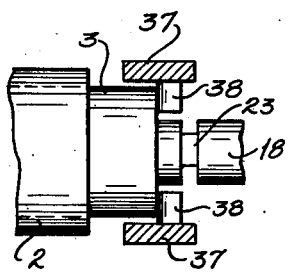
Figure 3 is a sectional view taken substantially along the line 3—3 of Figure 1.
Figure 4:
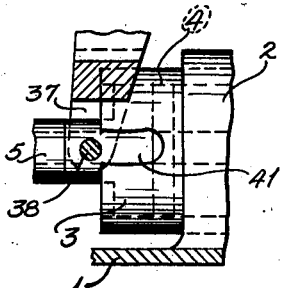
Figure 4 is an elevational view taken substantially along the line 4—4 of Figure 2.
Figure 1:
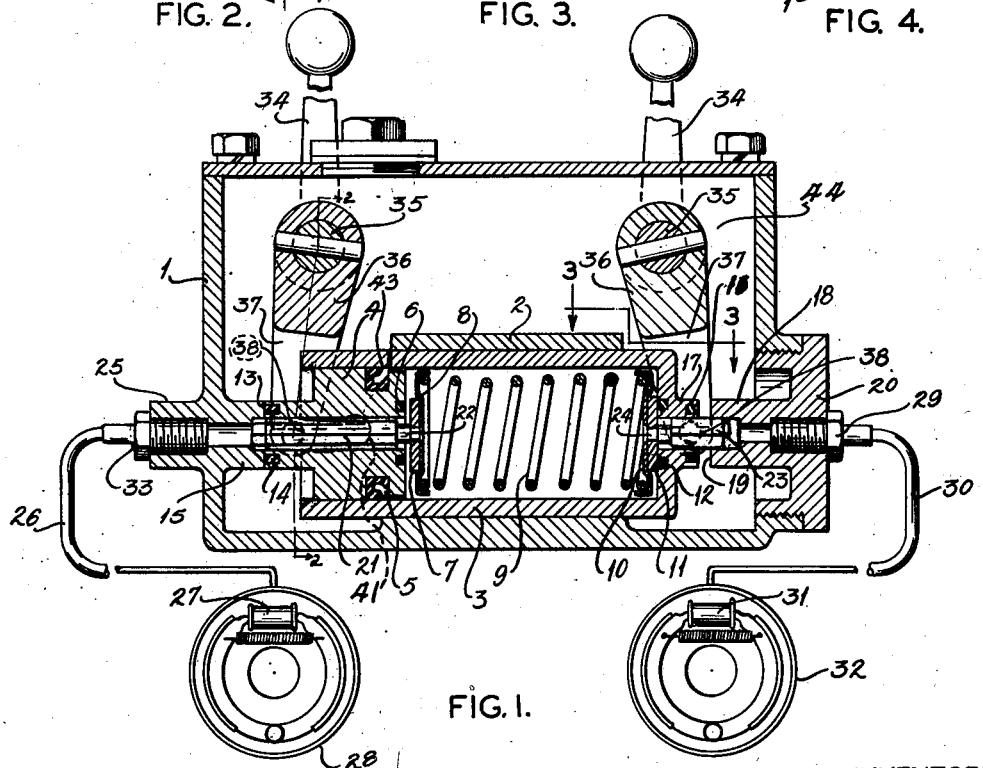
Figure 1 is an elevational sectional view of the preferred embodiment of the invention.

Referring now to the drawing, numeral 1 designates a casing in which the operative mechanism is housed and serves as a reservoir for a suitable operating fluid, e. g., a brake fluid. A cylindrical member 2 is integrally associated with the lower wall of the housing and a cylinder 3 is reciprocably mounted in member 2.

Disposed within cylinder 3 is a piston 4, provided with a suitable packing cup 5 to prevent leakage past piston 4. The piston is also provided with a ring type circular valve seat 6 with which a valve 7 is engageable. Valve 7 is secured to a circular dished washer 8. One end of a spring 9 seats in dished washer 8 and the other end of the spring seats in a dished washer 10. A valve 11 is secured to the dished washer 10 and is engageable with a ring type circular valve seat 12 set in the closed end of cylinder 3.

Piston 4 is provided with a projection which has a circular valve 13 arranged therein engageable with a valve seat 14 formed on the right hand face of a boss 15 integral with the casing 1. A complemental circular valve 16 is arranged in a boss 17 integral with the end wall of cylinder 3. The valve 16 is engageable with a seat 19 formed on an extension 18 of a plug 20 threaded into casing 1.

Piston 4 is provided with a centrally disposed bore which houses and guides valve stem 21 of valve 7. A head 22 on one end of stem 21 is received in a suitable aperture in valve 7. The other end of valve stem 21 engages with a seat in the counterbore of boss 15 and the length of valve stem 21 is such that it is greater than the length of the passage in piston 4. This greater length insures that when seat 14 and valve 13 are in intimate contact, valve 7 will be unseated from its seat 6.

A valve stem 23 is arranged in a suitable bore formed in the end wall of cylinder 3. Valve 11 is fitted over a head 24 on valve stem 23 and the opposite end of stem 23 seats in a counterbore in extension 18. The length of stem 23 in relation of the length of the bore in which the stem is placed is such that valve 11 will be open when valve 16 is in intimate contact with seat 19.

The casing is further provided with a boss 25 which is arranged opposite boss 15 and has a bore therein coaxial with the bore in boss 15. A suitable fitting 33 is applied to the bore in boss 25 to which one end of a conduit 26 is connected and its other end is connected to pressure fluid motor 27 of brake assembly 28. A suitable fitting 29 is applied to plug 20 with which one end of conduit 30 is connected and its other end is connected to pressure fluid motor 31 of brake assembly 32. While the particular illustration shows a brake assembly as the ultimately actuated device, it is clear that other devices may be substituted therefor.

A pair of levers 34, 34 are each secured to suitable spindles 35, 35 by means of yokes 36, 36, each provided with forked members 37, 37, for actuating the cylinder and piston relative to each other through the action of pins 38, 38 formed on each fork 37, 37. The portion of yoke 36 supported by spindle 35 is disposed between bosses 39 and 40 of casing 1 which prevents lateral movement of fork 37. The piston or open end of cylinder 3 is suitably slotted, as at 41 and 42 on an appropriate arc to accommodate the arcuate movement of pins 38 which are engageable with piston 4 to urge it to the right when the appropriate lever 34 is rotated on its spindle 35.

The port 43 in the side wall of cylinder 3 is so placed as to allow the free flow of fluid between the reservoir 44 and the chamber in cylinder 3 between the piston 4 and the valve 11. When the piston and cylinder are in the complete retracted position, the valves 13 and 16 are seated against boss 15 and extension 18, respectively, of plug 20. The retracted position of piston 4 and cylinder 3 is assumed when no pressure is applied to either of lever 34 because of the action of spring 9. The function of this port is to allow for the displacement of fluid from within the pressure system due to expansion and contraction caused by temperature changes and to make up any volume of fluid lost by passage around the seals of the pressure fluid motors.

Assuming that the system is filled with a suitable operating fluid and that it is desired to actuate motor 27 of brake assembly 28, then the operation of the device is as follows:

Right hand lever 34 is moved clockwise or to the right and through the action of yoke 36, 36, forks 37, 37 and pins 38, 38 urges cylinder 3 toward the left, causing valve 13 to engage seat 14 to prevent fluid escaping to the reservoir. The end of valve stem 21 engages a shoulder of the counterbore in boss 15, thus disengaging valve 7 from its seat 6. Pressure fluid developed within cylinder 3, together with the action of spring 9, firmly seats valve 11 against seat 12 preventing any escape of pressure fluid through the bore in the end wall of cylinder 3 and thus causing entrapped fluid within cylinder 3 to be forced out of cylinder 3 through the bore in piston 4 and thence through fitting 33 and conduit 26 into brake motor 27 when said entrapped fluid is subjected to pressure. When lever 34 is released by the operator, the combined action of the return spring of brake assembly 28 and spring 9 in cylinder 3 causes the apparatus to assume the position shown.

If it is desired to actuate brake motor 31, then the left hand lever 34 is moved counter-clockwise or to the left and through the action of yoke 36 and pins 38 acting on the rear or left hand side of piston 4, cylinder 3 is moved to the right by both the friction between the piston and cylinder and the force applied to the fluid within cylinder 3. This completely seats and seals the surface 18 against seat 19 of boss 18. Valve stem 23 now comes in contact with a shoulder of the counterbore in boss 18 and thus the valve 11 and valve seat 10 are opened. As pressure increases on the fluid in cylinder 3 and combines with the action of spring 9, valve 7 is seated on seat 6 to prevent the escape of any fluid through the bore in piston 4. Pressure fluid is thereafter forced through the bore in the end of cylinder 3 and then through the appropriate fitting 29 and conduit 30 to the brake motor 31. Release of the hand lever 31 by the operator permits the system to return to equilibrium by the combined action of the return spring of brake assembly 32 and spring 9 in cylinder 3.

Having fully described my invention, that which I claim as novel and desire to protect by Letters Patent of the United States is:

1. A mechanism for actuating a plurality of hydraulic systems comprising a movable cylinder device; a piston movable in said cylinder; means for selectively actuating said piston or cylinder each independently of the other; a pair of motors; means for establishing communication between said motors and said piston-cylinder device; valve means in each of said communication means; and means for selectively actuating said motors by actuating either said piston in combination with one of said valve means or said cylinder in combination with the other of said valve means.

2. A mechanism for selectively operating a pair of devices comprising a support; a cylinder reciprocably mounted in said support; a piston in said cylinder; a pair of motors; means for establishing communication between said piston-cylinder mechanism and each of said motors; valve means in each of said communication means; and means for selectively actuating said motors by actuating either said piston in combination with one of said valve means or said cylinder in combination with the other of said valve means.

3. A mechanism for selectively actuating a plurality of devices comprising a cylinder; a piston in said cylinder; a support in which said cylinder is reciprocably mounted; two systems to be actuated; means for establishing communication between one of said systems and said cylinder through said piston; means for establishing communication between the other of said systems and said cylinder; and valve means associated with each of said communication means for enabling fluid to be entrapped in one of the systems and for selectively actuating said systems when said piston and cylinder are selectively reciprocated relative to each other.

4. A mechanism for selectively actuating a plurality of devices comprising a casing; a cylinder reciprocably mounted in said casing; a piston reciprocably mounted in said cylinder; a pair of systems; means for establishing communication between the interior of said cylinder and said systems; valve means associated with said piston and cylinder mechanism actuated upon relative movement of said piston and cylinder; and means for selectively relatively moving said cylinder and said piston to thereby selectively actuate said system.

5. A mechanism for selectively actuating a plurality of devices comprising a cylinder; a piston in said cylinder; a support in which said cylinder is reciprocably mounted; two systems to be actuated; means for establishing communication between one of said systems and said cylinder through said piston; means for establishing communication between the other of said systems and said cylinder; means for reciprocating said piston relative to said cylinder; and valve means associated with each of said communication means for enabling fluid to be entrapped in one of the systems for selectively actuating said systems when said piston and cylinder are selectively reciprocated relative to each other.

6. A mechanism for selectively actuating a pair of pressure fluid systems comprising a cylinder; a piston in said cylinder for forming a chamber for fluid and movable in said cylinder for developing pressure in the fluid in the chamber; two motors; means for establishing communication between one of said motors and said chamber; a valve in said means; a second means for establishing communication between the other of said motors and said chamber; a valve in said second means; means for relatively moving said piston and said cylinder for positioning the valve in said first mentioned means for enabling pressure fluid to flow to and actuate the motor in said first mentioned means and positioning the valve in said second means for preventing pressure fluid flowing from said chamber; and other means for relatively moving said piston and said cylinder for positioning the valve in said second means for enabling pressure fluid to flow to said motor in said second means and positioning the valve in said first mentioned means for preventing pressure fluid flowing from said chamber.

7. A mechanism for selectively actuating a pair of pressure fluid systems comprising a cylinder; a piston in said cylinder for forming a chamber for fluid therein and movable in said cylinder for developing pressure in the fluid in the chamber; a fluid reservoir; means in said reservoir in which said cylinder is reciprocably mounted; two motors; a first means for establishing communication between one of said motors and said chamber; a valve in said first means; a second means for establishing communication between the other of said motors and said chamber; a valve in said second means; means for relatively moving said piston and said cylinder for position the valve in said first means for enabling pressure fluid to flow to and actuate the motor in said first means and positioning the valve in said second means for preventing pressure fluid flowing from said chamber to said reservoir; and other means for relatively moving said piston and said cylinder for positioning the valve in said second means for enabling pressure fluid to flow to said motor in said second means and positioning the valve in said first means for preventing pressure fluid flowing from said chamber into said reservoir.

ARTHUR N. MILSTER.

REFERENCES CITED

The following references are of record in the file of this patent:

UNITED STATES PATENTS

| Number | Name | Date |
|---|---|---|
| 1,682,781 | Gardner | Sept. 4, 1927 |
| 2,167,929 | Johnson | Aug. 1, 1939 |